United States Patent
Pan et al.

(10) Patent No.: US 8,712,136 B2
(45) Date of Patent: Apr. 29, 2014

(54) IMAGE RECONSTRUCTION ITERATIVE METHOD

(75) Inventors: Min-Chun Pan, Taoyuan County (TW);
Hung-Chih Chiang, Chiayi (TW);
Liang-Yu Chen, Taoyuan County (TW);
Min-Chen Pan, Keelung (TW)

(73) Assignee: National Central University, Taoyuan (TW)

( * ) Notice: Subject to any disclaimer, the term of this patent is extended or adjusted under 35 U.S.C. 154(b) by 84 days.

(21) Appl. No.: 13/397,693

(22) Filed: Feb. 16, 2012

(65) Prior Publication Data

US 2013/0089250 A1    Apr. 11, 2013

(30) Foreign Application Priority Data

Oct. 6, 2011   (TW) .............................. 100136301 A (51) Int. Cl.
  *G06K 9/00*    (2006.01)
(52) U.S. Cl.
  USPC ........................................................ 382/131
(58) Field of Classification Search
  None
  See application file for complete search history.

(56) References Cited

U.S. PATENT DOCUMENTS

| | | | |
|---|---|---|---|
| 6,064,917 A | 5/2000 | Matson | |
| 6,216,540 B1* | 4/2001 | Nelson et al. | .................... 73/633 |
| 7,218,959 B2 | 5/2007 | Alfano et al. | |
| 7,647,091 B2 | 1/2010 | Ntziachristos et al. | |
| 7,840,053 B2 | 11/2010 | Liao | |
| 7,916,283 B2 | 3/2011 | Fukutani et al. | |
| 2002/0106681 A1* | 8/2002 | Wexler et al. | ...................... 435/6 |
| 2007/0019208 A1 | 1/2007 | Toida et al. | |
| 2007/0038122 A1 | 2/2007 | Geng | |
| 2007/0238957 A1 | 10/2007 | Yared | |
| 2008/0058638 A1 | 3/2008 | Zhu et al. | |
| 2009/0005676 A1 | 1/2009 | Koenig et al. | |
| 2009/0240138 A1 | 9/2009 | Yi | |
| 2011/0060211 A1 | 3/2011 | Lorenzo et al. | |
| 2011/0081064 A1 | 4/2011 | Hsu et al. | |
| 2011/0142316 A1* | 6/2011 | Wang et al. | ................... 382/131 |
| 2013/0089250 A1* | 4/2013 | Pan et al. | ...................... 382/131 |

FOREIGN PATENT DOCUMENTS

TW            098133815          4/2011

OTHER PUBLICATIONS

Guven, Murat, et al. "Diffuse optical tomography with a priori anatomical information." Physics in medicine and biology 50.12 (2005): pp. 2837-2858.*

Q. Zhu, N. Chen, S. H. Kurtzman, "Imaging tumor angiogenesis by use of combined near-infrared diffusive light and ultrasound," Optics Letters, vol. 28, No. 5, pp. 337-339 (2003).

A. Li, E. L. Miller, M. E. Kilmer, T. J. Brukilacchio, T. Chaves, J. Stott, Q. Zhang, T. Wu, M. Chorlton, R. H. Moore, D. Kopans and D. A. Boas, "Tomographic optical breast imaging guided by three-dimensional mammography," Applied Optics, vol. 42, No. 25, pp. 5181-5190 (2003).

(Continued)

*Primary Examiner* — Tahmina Ansari
(74) *Attorney, Agent, or Firm* — CKC & Partners Co., Ltd.

(57) ABSTRACT

An image reconstruction method is described as follows. A structural image of an object is obtained. An actual optical detected result of the object is obtained. An inhomogeneous initial state is determined based on the structural image. At least one solution converged with the actual optical detected result is determined by iteratively calculating a physical model from the inhomogeneous initial state. The image of the object is reconstructed based on the solution.

18 Claims, 4 Drawing Sheets

(56) References Cited

OTHER PUBLICATIONS

B. Brooksby, S. Jiang, H. Dehghani, B. W. Pogue, K. D. Paulsen, C. Kogel, M. Doyley, J.B. Weaver, and S. P. Poplack, "Magnetic resonance-guided near-infrared tomography of the breast," Rev. Sci. Instrum., vol. 75, No. 12, pp. 5262-5270 (2004).

B. Brooksby, S. Jiang, H. Dehghani, B. W. Pogue, K. D. Paulsen, J. Weaver, C. Kogel and S. P. Poplack, "Combining near-infrared tomography and magnetic resonance imaging to study in vivo breast tissue: implementation of a Laplacian-type regularization to incorporate magnetic resonance structure," Journal of Biomedical Optics, vol. 10, No. 5, pp. 051504:1-051504:1-051504:1 (2005).

Q. Zhang, T. J. Brukilacchio, A. Li, J. J. Stott, T. Chaves, E. Hillman, T. Wu, M. Chorlton, E. Rafferty, R. H. Moore and D. A. Boas, "Coregistered tomographic X-ray and optical breast imaging:Initia results," Journal of Biomedical Optics, vol. 10, No. 2, pp. 024033:1-024033:9 (2005).

M. Guven, B. Yazici, X. Intes and B. Chance, "Diffuse optical tomography with a priori anatomical information," Phys. Med. Biol., vol. 50, pp. 2837-2858 (2005).

P. K. Yalavarthy, B. W. Pogue, H. Dehghani, C. M. Carpenter, S. Jiang and K. D. Paulsen, "Structural information within regularization matrices improves near infrared diffuse optical tomography," Optics Express, vol. 15, No. 13, pp. 8043-8058 (2007).

P. K. Yalavarthya, B. W. Pogue, H. Dehghani and K. D. Paulsen, "Weight-matrix structured regularization provides optimal generalized least-squares estimate in diffuse optical tomography," Am. Assoc. Phys. Med., vol. 34, No. 6, pp. 2085-2098 (2007).

Q. Fang, S. A. Carp, J. Selb, G. Boverman, Q. Zhang, D. B. Kopans, R. H. Moore, E. L. Miller, D. H. Brooks and D. A. Boas, "Combined Optical Imaging and Mammography of the Healthy Breast: Optical Contrast Derived From Breast Structure and Compression," IEEE Transactions on Medical Imaging, vol. 28, No. 1, pp. 30-42 (2009).

\* cited by examiner

IMAGE RECONSTRUCTION ITERATIVE METHOD

CROSS-REFERENCE TO RELATED APPLICATION

This application claims the priority benefit of Taiwan application serial no. 100136301, filed Oct. 6, 2011, the full disclosure of which is incorporated herein by reference.

BACKGROUND

1. Technical Field

Embodiments of the present invention relate to an algorithm used in body imaging. More particularly, embodiments of the present invention relate to an image reconstruction method.

2. Description of Related Art

Along with the overall development in technology, body imaging performed in anon-invasive manner has become a common medical technique. In the biomedical optical field, DOT (Diffuse Optical Tomography) is an important area to be developed.

DOT is typically used to detect brain functionality and breast cancer. DOT utilizes the near-infrared region of the electromagnetic spectrum to measure the diffusion and absorption of normal and abnormal tissues, so as to reconstruct a body image. The image reconstruction method of DOT involves utilizing forward computing and inverse reconstruction to perform an iterative operation. In forward computing, a homogeneous optical coefficient provided by a diffuse optical model and the luminous intensity of a light source are employed to obtain a theoretic luminous intensity at an actual measured location. In inverse reconstruction, the measured luminous intensity at the actual measured location is employed to perform inverse computing to obtain an actual optical coefficient that is more precise than the homogeneous optical coefficient. Subsequently, the actual optical coefficient generated from the inverse reconstruction is used in forward computing to obtain another theoretic luminous intensity. After repeated iterations of this process, when the theoretic luminous intensity obtained from the forward computing converges with the measured actual luminous intensity, the actual optical coefficient generated from the latest inverse reconstruction can be utilized to reconstruct the image.

However, it is very difficult to accurately obtain the actual optical coefficient. This is due to the fact that inverse reconstruction is a very complicated nonlinear calculation with Ill-posed and Ill-conditioned characteristics, and further due to the low spatial characteristics inherent in DOT. Hence, body imaging is made difficult, and image quality and accuracy are lowered.

SUMMARY

In some embodiments of the present invention, an image reconstruction method includes at least the following steps: obtaining a structural image of an object; obtaining an actual optical detected result of the object; determining an inhomogeneous initial state based on the structural image; iteratively calculating a physical model from the inhomogeneous initial state to determine at least one solution converged with the actual optical detected result; and reconstructing an image of the object based on the solution.

In some embodiments, determining an inhomogeneous initial state includes determining a region of suspected lesion, and providing an optical coefficient to the region of suspected lesion different from other areas for use as the inhomogeneous initial state.

In some embodiments, obtaining the structural image is performed by computed tomography, mammography, Nuclear Magnetic Resonance (MNR) spectroscopy, Magnetic resonance imaging (MRI), Digital Breast Tomosynthesis (DBT) or combinations thereof.

In some embodiments, the inhomogeneous initial state is a two-dimensional inhomogeneous initial state or a three-dimensional inhomogeneous initial state.

In some embodiments, obtaining an actual optical detected result of the object includes emitting an incident light into the object by a light source, and detecting a luminous intensity of diffusion light passing through the object by a light detector for use as the actual optical detected result.

In some embodiments, iteratively calculating the physical model includes repeatedly performing forward computation and inverse reconstruction.

In some embodiments, a theoretical optical detected result is obtained by the forward computation using the inhomogeneous initial state.

In some embodiments, an updated state is obtained by the inverse reconstruction by using the actual optical detected result.

In some embodiments, the physical model is a diffusion optical model.

In some embodiments, a computer readable storage medium is provided, which stores one or more programs comprising instructions to perform an image reconstruction method, and the method includes at least following steps: obtaining a structural image of an object; obtaining an actual optical detected result of the object; determining an inhomogeneous initial state based on the structural image; iteratively calculating a physical model from the inhomogeneous initial state to determine at least one solution converged with the actual optical detected result; and reconstructing an image of the object based on the solution.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Embodiments of the present invention can be widely applied in body imaging performed in a non-invasive manner, such as body imaging related to brain and breast detections. In the following embodiments, detection performed with respect to a human breast is used as an example, that is, a human breast is the object that is targeted for detection and imaging purposes in the following embodiments. However, it should be understood that such an object is merely used as an example in the embodiments to explain the present invention, and the present invention is not limited to breast detection.

The image reconstruction method in accordance with embodiments of the present invention utilizes a combination of diffuse optical tomography and a structural image to realize image reconstruction. In one embodiment of the present invention, an inhomogeneous initial state, which is determined based on a structural image, is introduced to perform iterative calculations. A homogeneous state is not required to perform iterative calculations, and hence, the image can be reconstructed more precisely and more quickly. In some embodiments, the technique for obtaining a structural image may include, but is not limited to, computed tomography, mammography, Nuclear Magnetic Resonance (MNR) spectroscopy, Magnetic resonance imaging (MRI), Digital Breast Tomosynthesis (DBT) or combinations thereof. In some embodiments, the inhomogeneous initial state may be two-dimensional or three-dimensional. For example, computed tomography, mammography, and MNR spectroscopy can provide a two-dimensional image, so that a two-dimensional inhomogeneous initial state may be determined using these techniques. Digital Breast Tomosynthesis (DBT) can provide a three-dimensional inhomogeneous initial state, so that a three-dimensional inhomogeneous initial state may be determined using these techniques.

Figure 1:
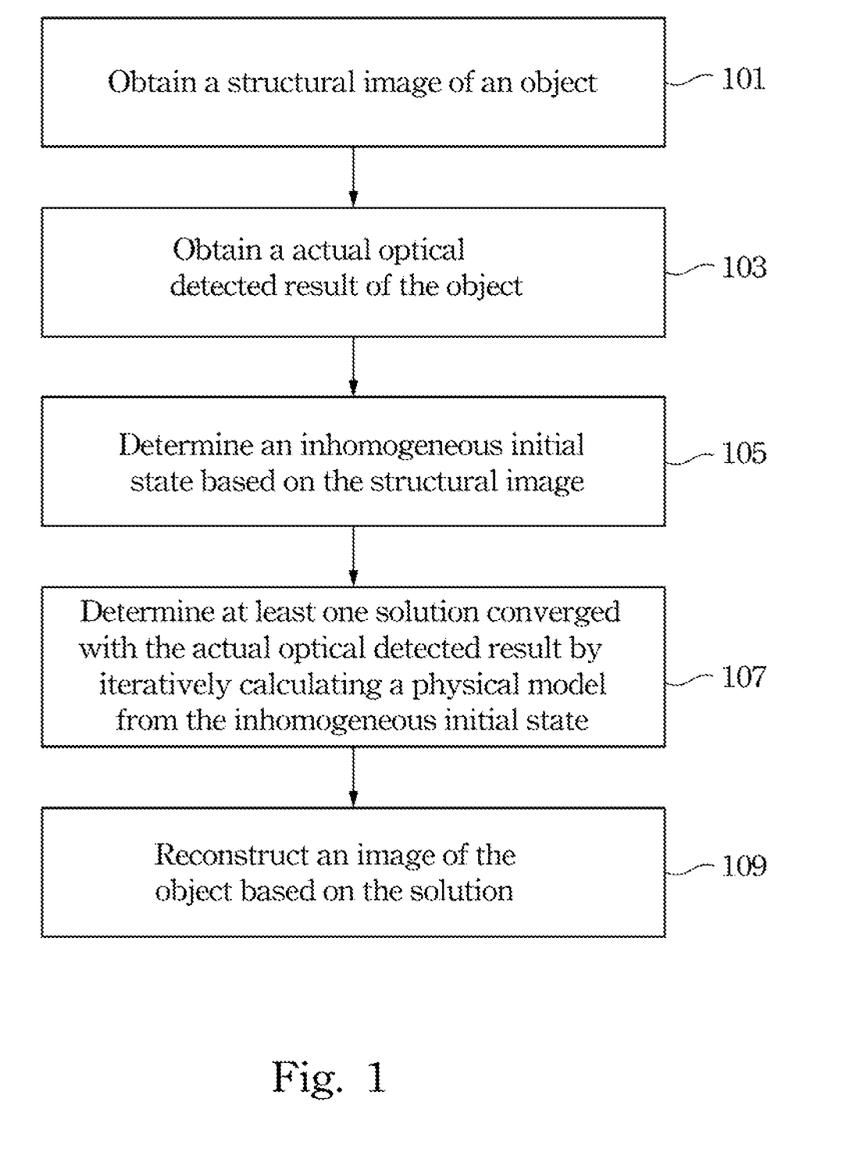
FIG. 1 shows a flow chart illustrating an image reconstruction method in accordance with an embodiment of the present invention.

FIG. 1 shows a flow chart illustrating an image reconstruction method in accordance with an embodiment of the present invention. The image reconstruction method comprises a number of steps which will be described below with reference to FIG. 1.

A structural image of an object is obtained (101). Next, an actual optical detected result of the object is obtained (103). An inhomogeneous initial state based on the structural image is subsequently determined (105). At least one solution converged with the actual optical detected result is determined by iteratively calculating a physical model from the inhomogeneous initial state (107). Next, an image of the object based on the solution is reconstructed (109). In this embodiment, a region of suspected lesion can be determined by a structural image. An optical coefficient of the region of suspected lesion can be assigned in a manner that is different from other areas, and the optical coefficient is the inhomogeneous initial state.

Through the aforementioned method, the embodiment of the present invention employs a structural image to determine the inhomogeneous initial state and performs iterative calculations using the inhomogeneous initial state, so as to reconstruct the image, thereby promoting the spatial resolution of the image.

Figure 2:
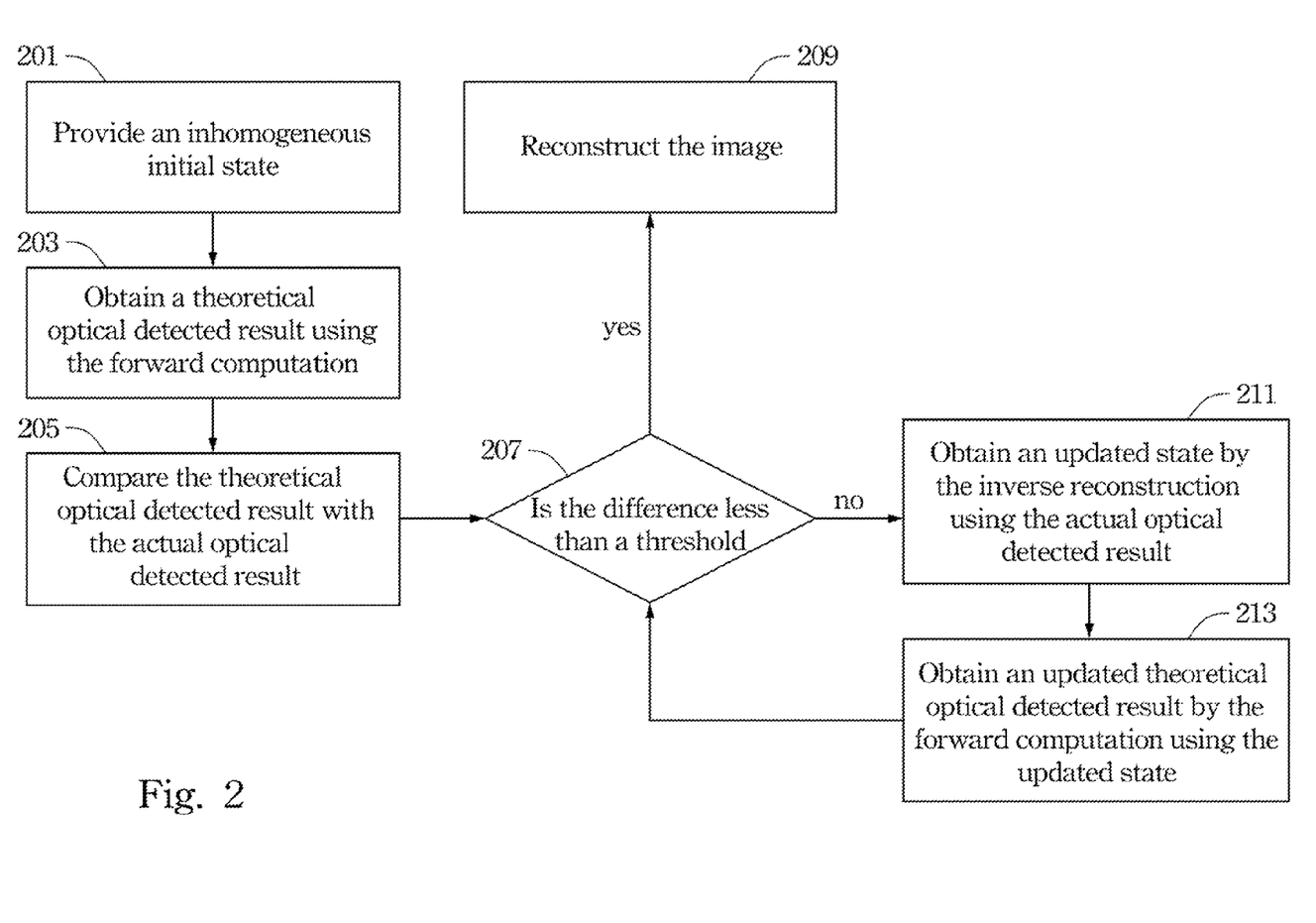
FIG. 2 shows a flow chart illustrating an iterative calculation of FIG. 1.

FIG. 2 shows a flow chart illustrating the iterative calculation of FIG. 1. An inhomogeneous initial state is provided (201), in which the inhomogeneous initial state is determined by the structural image. Next, a theoretical optical detected result is obtained using the forward computation (203). Specifically, the forward computation is initiated from a physical model using the inhomogeneous initial state together with the luminous intensity to obtain the theoretical luminous intensity for use as the theoretical optical detected result. The aforementioned physical model is a diffusion optical model. The theoretical optical detected result is then compared with the actual optical detected result (205). The difference between the theoretical optical detected result and the actual optical detected result is examined to determine whether the difference is less than a threshold (207). If the difference is less than the threshold, the result is convergent, and therefore, the image is reconstructed according to this inhomogeneous initial state (209). If the difference is greater than or equal to the threshold, an updated state is obtained by inverse reconstruction using the actual optical detected result (211). The aforementioned threshold can be determined by a user depending on actual requirements. Next, an updated theoretical optical detected result can be obtained by the forward computation using the updated state (213). After obtaining the updated theoretical optical detected result, the procedure returns back to step 207, where the difference between the updated theoretical optical detected result and the actual optical detected result is examined to determine whether the difference is less than the threshold. If the difference is less than the threshold, the image is reconstructed based on the updated state (209). If the difference is greater than or equal to the threshold, steps 211, 213, and 207 are subsequently repeated until the updated theoretical detected result converges with the actual optical detected result. When the last updated theoretical optical detected result converges with the actual optical detected result, the image is reconstructed based on the last updated state.

Figure 3:
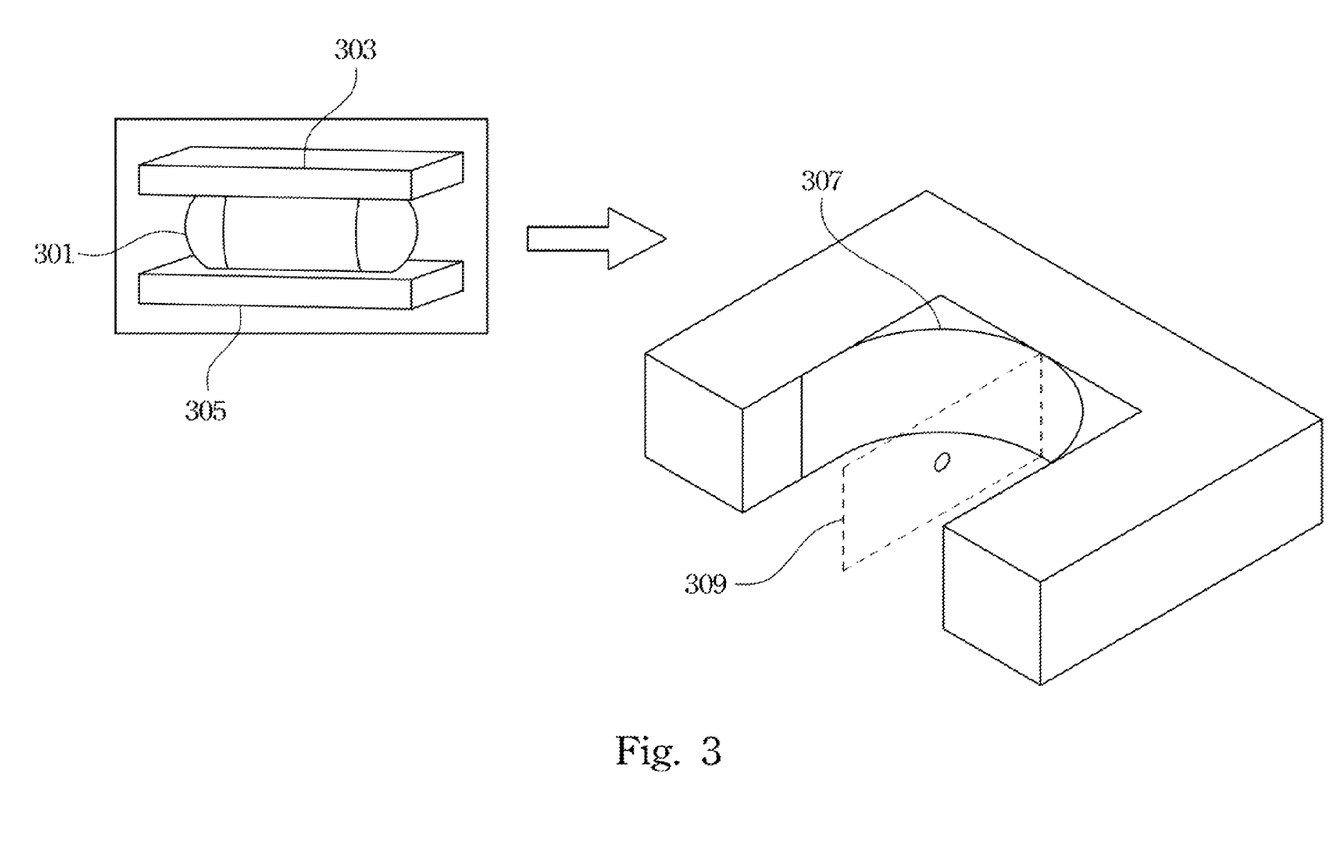
FIG. 3 is a schematic view showing a structural image captured by mammography.

FIG. 3 is a schematic view showing a structural image captured by mammography. In mammography, a breast 301 is pressed between an upper fixing plate 303 and a lower fixing plate 305 and is exposed to X-rays, so that a breast image 307 can be obtained. A region of suspected lesion 309 can be determined based on the breast image 307. In some embodiments, the region of suspected lesion 309 can be determined based on gray scale of the breast image 307. According to clinical research results, an initial estimated optical coefficient of the region of suspected lesion can be provided for use as the inhomogeneous initial state. For example, the optical coefficients of different kinds of tissues of the breast are listed in the table below, and the optical coefficients can be used to determine the inhomogeneous initial state. In this table, n is the number of samples, in which all samples come from the female breast.

| Tissue | λ, nm | $\mu_a$, cm⁻¹ | $\mu_s$, cm⁻¹ | $\mu_s'$, cm⁻¹ | g | Notes |
|---|---|---|---|---|---|---|
| Normal fatty | 749 | 0.18 | 8.48 | | | |
| tissue | 789 | 0.08 | 7.76 | | | |
| (n = 23) | 836 | 0.11 | 7.27 | | | |
| Normal fiber | 749 | 0.13 | 9.75 | | | |
| tissue | 789 | 0.06 | 8.94 | | | |
| (n = 35) | 836 | 0.05 | 8.10 | | | |
| Infiltrating | 749 | 0.15 | 10.91 | | | |
| carcinoma | 789 | 0.04 | 10.12 | | | |
| (n = 48) | 836 | 0.10 | 9.10 | | | |
| Mucinous | 749 | 0.26 | | 6.15 | | |
| carcinoma | 789 | 0.016 | | 5.09 | | |
| (n = 3) | 836 | 0.023 | | 4.78 | | |
| Ductal | 749 | 0.076 | | 13.10 | | |
| carcinoma | 789 | 0.023 | | 12.21 | | |
| (n = 5) | 836 | 0.039 | | 10.46 | | |
| Glandular | 540 | 3.58 | | 24.4 | | |
| tissue | 700 | 0.47 | | 14.2 | 9.9 | |
| (n = 3) | 900 | 0.62 | | | | |
| Fatty tissue | 540 | 2.27 | | 10.3 | | |
| (n = 7) | 700 | 0.70 | | 8.6 | | |
| | 900 | 0.75 | | 7.9 | | |

-continued

| Tissue | λ, nm | $\mu_a$, cm$^{-1}$ | $\mu_s$, cm$^{-1}$ | $\mu_s'$, cm$^{-1}$ | g | Notes |
|---|---|---|---|---|---|---|
| Fibrocystic | 540 | 1.64 | | 21.7 | | |
| (n = 8) | 700 | 0.22 | | 13.4 | | |
| | 900 | 0.27 | | 9.5 | | |
| Fibro- | 540 | 4.38 | | 11.1 | | |
| adenoma | 700 | 0.52 | | 7.2 | | |
| (n = 6) | 900 | 0.72 | | 5.3 | | |
| Carcinoma | 540 | 3.07 | | 19.0 | | |
| (n = 9) | 700 | 0.45 | | 11.8 | | |
| | 900 | 0.50 | | 8.9 | | |
| Carcinoma | 580 | 4.5 | | | | |
| | 850 | 0.4 | | | | |
| | 1300 | 0.5 | | | | |
| Adjacent | 580 | 2.6 | | | | |
| healthy | 850 | 0.3 | | | | |
| tissue | 1300 | 0.8 | | | | |
| Fatty tissue | 700 | | | 13 | 0.95 | |
| Fibro- | 700 | | | 12 | 0.92 | |
| glandular | | | | | | |
| tissue | | | | | | |
| Carcinoma | 700 | | | 18 | 0.88 | Central of the breast |
| Fatty tissue | 625 | 0.06 | | 14.3 | | |
| Benign tumor | 625 | 0.33 | | 3.8 | | |
| Incasive | 600 | 1.90 | | 26.8 | | (55-65 |
| ductal | 610 | 1.82 | | 26.8 | | years of |
| carnimona | 620 | 1.71 | | 26.4 | | age, |
| | 630 | 1.64 | | 26.2 | | n = 10) |
| | 640 | 1.55 | | 25.9 | | (1-35 |
| | 650 | 1.48 | | 25.7 | | years of age, n = 9) |
| Adjacent | 600 | 1.00 | | 16.4 | | (55-65 |
| healthy | 610 | 0.95 | | 16.2 | | years of |
| tissue | 620 | 0.89 | | 15.9 | | age, =10) |
| | 630 | 0.82 | | 15.7 | | (1-35 |
| | 640 | 0.79 | | 15.5 | | years of |
| | 650 | 0.74 | | 15.3 | | age, n = 9) |

The variables appearing in the above table may be defined as follows:

λ is the wavelength of incident light;

$\mu_a$ is the absorbing coefficient;

$\mu_s$ is the scattering coefficient;

$\mu_s'$ is the reduced scattering coefficient; and g is the scattering anisotropy.

In some embodiments, the forward computation utilizes an inhomogeneous initial state as an initial condition to resolve a diffusing equation by FEM (Finite Element Method), thereby obtaining the theoretical optical detected result of each node of the object. In some embodiments, the theoretical optical detected result may include, but is not limited to including, the luminous intensity or the luminous flux. Before proceeding with FEM, the coordinate and the boundary conditions may be determined in advance. Embodiments of the present invention employ computer-aided design or finite element analysis software to establish the mesh. The boundary conditions required for the boundary nodes may include, but is not limited to including, Dirichled type, Neumann type, and Robbins type. In Dirichled type, the luminous intensity on a particular node is assigned. In Neumann type, the luminous flux on a particular node is assigned. In Robbins type, both luminous intensity and flux are assigned. In some embodiments, Robbins is applied to determine the boundary condition. After the boundary conditions are defined, FEM can utilize the inhomogeneous state with luminous intensity of the actual light source to obtain the theoretical luminous intensity of each node. The following equations are obtained:

$$\begin{bmatrix} A_{ij}^{bb} - \alpha B_{ij}^{bb} & A_{ij}^{bI} \\ A_{ij}^{Ib} & A_{ij}^{II} \end{bmatrix} \begin{Bmatrix} \Phi_j^b \\ \Phi_j^I \end{Bmatrix} = \begin{Bmatrix} C_i^b \\ C_i^I \end{Bmatrix},$$

where $$A_{ij} = \left\langle -\sum_{k=1}^{K} D_k \varphi_k \nabla \varphi_j \cdot \nabla \varphi_i \right\rangle - \left\langle \left( \sum_{l=1}^{K} \mu_l \varphi_l - \frac{i\omega}{c} \right) \varphi_i \varphi_j \right\rangle;$$

$$B_{ij} = \oint \varphi_i \varphi_j dS;$$

$$C_i = -\langle S\varphi_i \rangle;$$

In the aforementioned equations, Φ is the luminous intensity or flux, D is the diffusion coefficient, φ is the weighting function of Lagrangian function, ω is the frequency of the light source, and S is the photons increased in a unit volume. Through these equations, the absorbing and scattering coefficients of each node can be determined, and the theoretical luminous intensity of each node can be obtained by the absorbing and scattering coefficients and the luminous intensity of the actual light source.

In some embodiments, inverse reconstruction utilizes an actual optical detected result to inversely calculate and thereby update the optical coefficient of each node. Because there is no analytic equation directly obtaining the optical coefficient, the objective function $\chi^2$ has to be minimized, that is, $$\min \chi^2 = \min \sum_{i=1}^{N} [\Phi_i^M - \Phi_i^C]^2.$$

The aforementioned equation can be resolved by iterative calculation using a numerical method. In this equation, i is the number of nodes established by forward computation, and $\Phi^M$ and $\Phi^C$ are actual optical detected result and theoretical optical detected result respectively, such as the actual luminous intensity and the theoretical luminous intensity. Because the luminous intensity is a function of the optical coefficient, the Newton-Raphson Method can be applied to minimize the objective function. The equation can be provided as:

$$[J] \begin{bmatrix} \Delta \mu_A \\ \Delta D \end{bmatrix} = [\Phi^M - \Phi^C].$$

In this equation, [J] is the Jacobian matrix including the optical coefficients, which indicates variations of optical coefficients between nodes in the discrete system. Because [J] is not a square matrix, the variations of optical coefficients cannot be directly obtained by multiplying the inverse matrix. Instead, the following equation is provided:

$$\begin{bmatrix} \Delta \mu_a \\ \Delta D \end{bmatrix} =$$

$$([J]^T[J] + \lambda^2 L^T L)^{-1} [J]^T \{[\Phi^M - \Phi^C] = \lambda L^T L((\mu_{ai}, D_i) - (\mu_{a0}, D_0))\}$$

The aforementioned equation can be employed to calculate the variations of optical coefficients. λ is a regularization parameter. L is a regularization weighting matrix. The regularization weighting matrix $L_{ij}$ can be established using the Laplacian-type Matrix and according to the region of suspected lesion determined by the structural image.

The method for determining weighting of the matrix is now described. i and j respectively represent the number of the nodes in the mesh. When i and j are in different areas, the weighting value is 0. If i and j are in the same area, the weighting value equals −1/N, in which N is the number of nodes included in the mesh in the region of suspected lesion determined by the structural image. The Laplacian-type weighting matrix is intended to modify the variation of the optical coefficient of the region of suspected lesion. Through the aforementioned computation, the variation of the optical coefficient can be determined, thereby obtaining the updated state.

Figure 4:
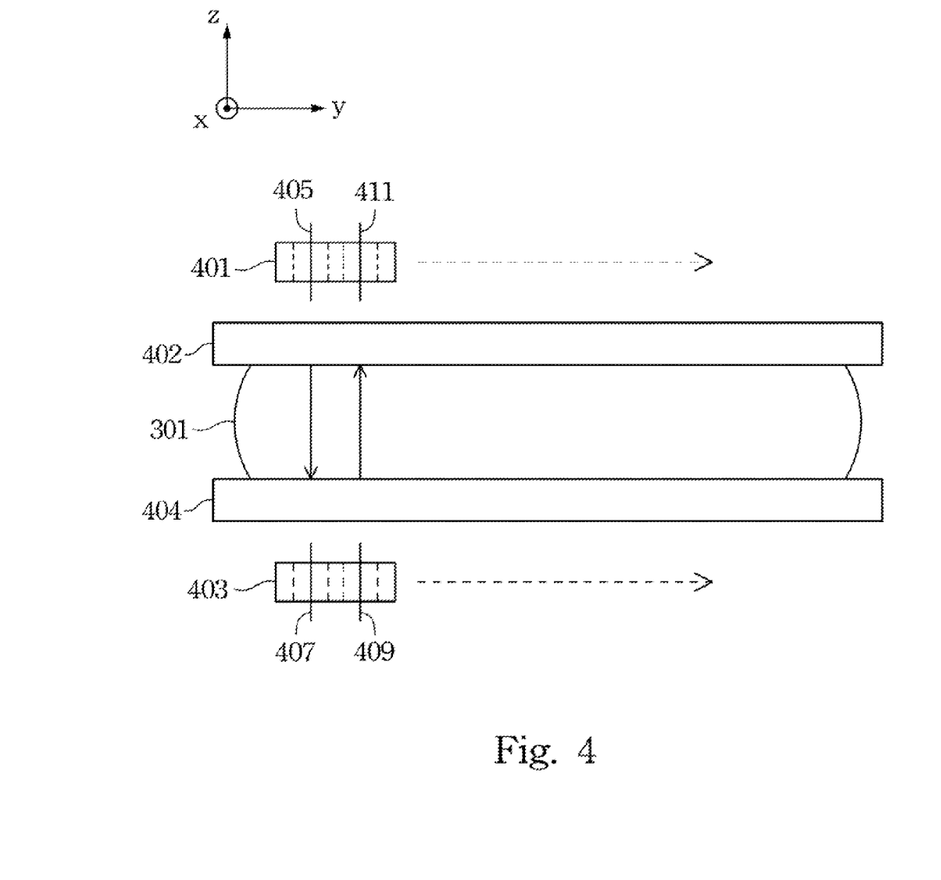
FIG. 4 is a side view of an optical detecting apparatus in accordance with one embodiment of the present invention.

FIG. 4 is a side view of an optical detecting apparatus in accordance with one embodiment of the present invention. As shown in this figure, the optical detecting apparatus includes an upper light plate 401, a lower light plate 403, an upper pressing plate 402 and a lower pressing plate 404. The upper pressing plate 402 and the lower pressing plate 404 are used for pressing and holding in place the breast 301. The upper light plate 401 comprises at least one light source 405, and the lower light plate 403 comprises at least one light detector 407. The upper light plate 401 and the lower light plate 403, and therefore the light source 405 and light detector 407, are disposed at opposite sides of the breast 301. The light source 405 is used for emitting light into the breast 301, and the light detector 407 is used for receiving the resulting diffused light after being transmitted through the breast 301, and the detected luminous intensity of the light detector 407 can be used as the actual optical detected result. Moreover, the lower light plate 403 also comprises at least one light source 409, and the upper light plate 401 comprises at least one light detector 411, and hence, the light source 409 and the light detector 411 are disposed at opposite sides of the breast 301. Similar to the foregoing method of operation, the light source 409 is used for emitting light into the breast 301, and the light detector 411 is used for receiving the resulting diffused light after being transmitted through the breast 301, and the detected luminous intensity of the light detector 407 can be used as the actual optical detected result. In this embodiment, because the upper light plate 401 and the lower light plate 403 both have a light source and a light detector, the apparatus can detect light in dual directions.

Figure 5:
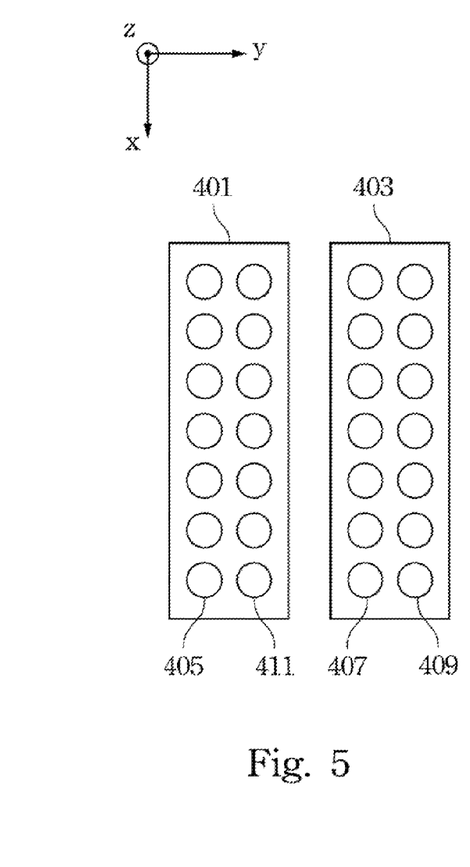
FIG. 5 is a top view of an upper light plate and a lower light plate in accordance with one embodiment of the present invention.

FIG. 5 is a top view of the upper light plate and the lower light plate in accordance with one embodiment of the present invention. As shown in FIG. 5, the upper light plate 401 comprises seven light sources 405 and seven light detectors 411, and the lower light plate 403 comprises seven light detectors 407 and seven light sources 409. The light sources 405 of the upper light plate 401 correspond respectively to the light detectors 407 of the lower light plate 403, and the light detectors 411 of the upper light plate 401 correspond respectively to the light sources 409 of the lower light plate 403. In this embodiment, the upper light plate 401 and the lower light plate 403 can be moved horizontally. In other words, the upper light plate 401 an the lower light plate 403 can be moved along direction y. Alternatively, each of the upper light plate 401 and the lower light plate 403 can be rotated so that the length thereof extends along direction y, after which they can be moved along direction x. As a result, actual optical detected results can be increased, thereby increasing the amount of information used in inverse reconstruction.

In some embodiments, a computer readable storage medium is disclosed, which stores one or more programs comprising instructions to perform the methods disclosed above. For example, the computer readable storage medium may include, but is not limited to including, a hard disk, a floppy disk, an USB, CD-ROM, DVD, Blue-ray DVD, and so on.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image reconstruction method, comprising:
obtaining a structural image of an object;
obtaining an actual optical detected result of the object;
determining an inhomogeneous initial state based on the structural image;
iteratively calculating a physical model from the inhomogeneous initial state to determine at least one solution converged with the actual optical detected result; and
reconstructing an image of the object based on the solution.

2. The image reconstruction method of claim 1, wherein determining an inhomogeneous initial state comprises:
determining a region of suspected lesion; and
providing an optical coefficient for the region of suspected lesion different from other areas for use as the inhomogeneous initial state.

3. The image reconstruction method of claim 1, wherein the structural image is obtained by computed tomography, mammography, Nuclear Magnetic Resonance (MNR) spectroscopy, Magnetic resonance imaging (MRI), Digital Breast Tomosynthesis (DBT) or combinations thereof.

4. The image reconstruction method of claim 1, wherein the inhomogeneous initial state is a two-dimensional inhomogeneous initial state or a three-dimensional inhomogeneous initial state.

5. The image reconstruction method of claim 1, wherein obtaining an actual optical detected result of the object comprises:
emitting an incident light into the object by a light source; and
detecting a luminous intensity of diffusion light transmitting through the object by a light detector for use as the actual optical detected result.

6. The image reconstruction method of claim 1, wherein iteratively calculating the physical model comprises repeatedly performing a forward computation and an inverse reconstruction.

7. The image reconstruction method of claim 6, wherein a theoretical optical detected result is obtained by the forward computation using the inhomogeneous initial state.

8. The image reconstruction method of claim 6, wherein an updated state is obtained by the inverse reconstruction using the actual optical detected result to subsequently perform the forward computation.

9. The image reconstruction method of claim 1, wherein the physical model is a diffusion optical model.

10. A non-transitory computer-readable storage medium having computer readable instructions stored thereupon that, when executed by a computer, cause the computer to:
obtaining a structural image of an object;
obtaining an actual optical detected result of the object;
determining an inhomogeneous initial state based on the structural image;
iteratively calculating a physical model from the inhomogeneous initial state to determine at least one solution converged with the actual optical detected result; and
reconstructing an image of the object based on the solution.

11. The non-transitory computer-readable storage medium of claim 10, wherein determining an inhomogeneous initial state comprises:
 determining a region of suspected lesion; and
 providing an optical coefficient for the region of suspected lesion different from other areas for use as the inhomogeneous initial state.

12. The non-transitory computer-readable storage medium of claim 10, wherein the structural image is obtained by computed tomography, mammography, Nuclear Magnetic Resonance (MNR) spectroscopy, Magnetic resonance imaging (MRI), Digital Breast Tomosynthesis (DBT) or combinations thereof.

13. The non-transitory computer-readable storage medium of claim 10, wherein the inhomogeneous initial state is a two-dimensional inhomogeneous initial state or a three-dimensional inhomogeneous initial state.

14. The non-transitory computer-readable storage medium of claim 10, wherein obtaining an actual optical detected result of the object comprises:
 emitting an incident light into the object by a light source; and
 detecting a luminous intensity of diffusion light transmitting through the object by a light detector for use as the actual optical detected result.

15. The non-transitory computer-readable storage medium of claim 10, wherein iteratively calculating the physical model comprises repeatedly performing a forward computation and an inverse reconstruction.

16. The non-transitory computer-readable storage medium of claim 15, wherein a theoretical optical detected result is obtained by the forward computation using the inhomogeneous initial state.

17. The non-transitory computer-readable storage medium of claim 15, wherein an updated state is obtained by the inverse reconstruction using the actual optical detected result to subsequently perform the forward computation.

18. The non-transitory computer-readable storage medium of claim 10, wherein the physical model is a diffusion optical model.

* * * * *